Sept. 22, 1953          H. C. HENRY          2,652,862

ADJUSTABLE-SAW CARRIAGE FOR FOLDING ARM RADIAL SAWS

Filed April 29, 1948          7 Sheets-Sheet 2

Horace C. Henry
INVENTOR.

BY

Sept. 22, 1953  H. C. HENRY  2,652,862
ADJUSTABLE-SAW CARRIAGE FOR FOLDING ARM RADIAL SAWS
Filed April 29, 1948  7 Sheets-Sheet 3

Horace C. Henry
INVENTOR.

Sept. 22, 1953　　　　H. C. HENRY　　　　2,652,862
ADJUSTABLE-SAW CARRIAGE FOR FOLDING ARM RADIAL SAWS
Filed April 29, 1948　　　　　　　　7 Sheets-Sheet 4

Horace C. Henry
INVENTOR.

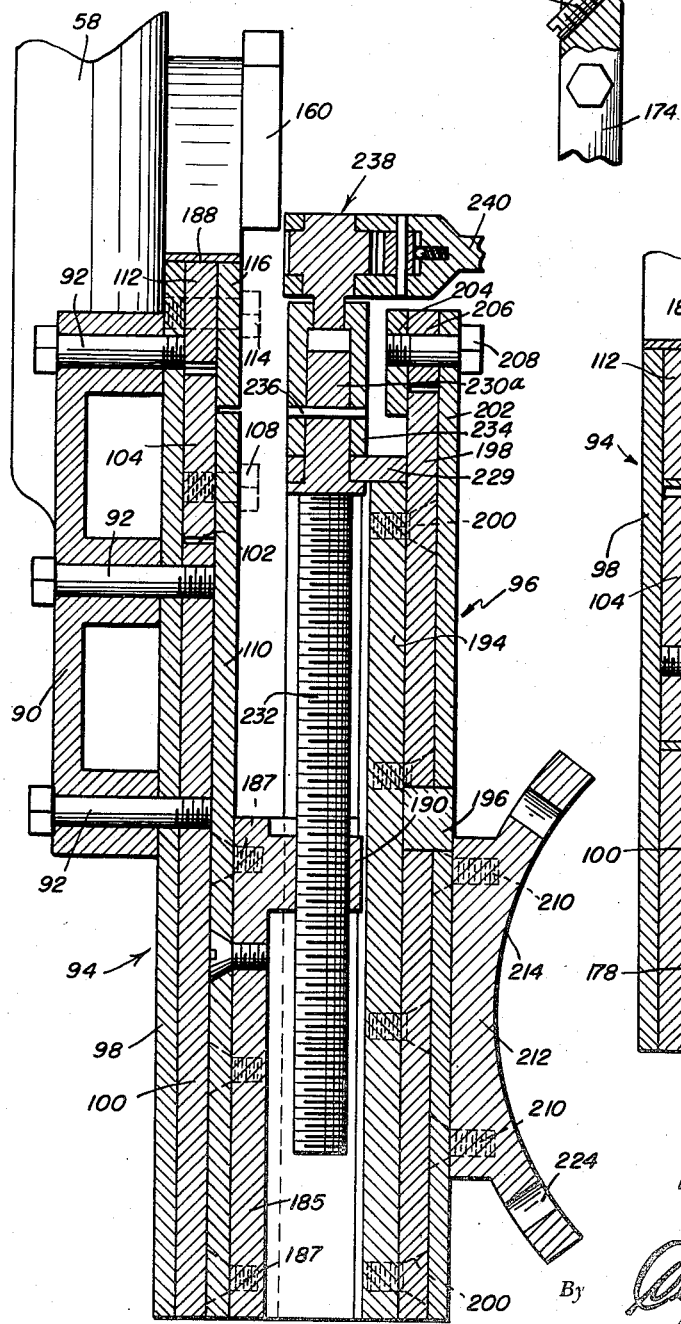

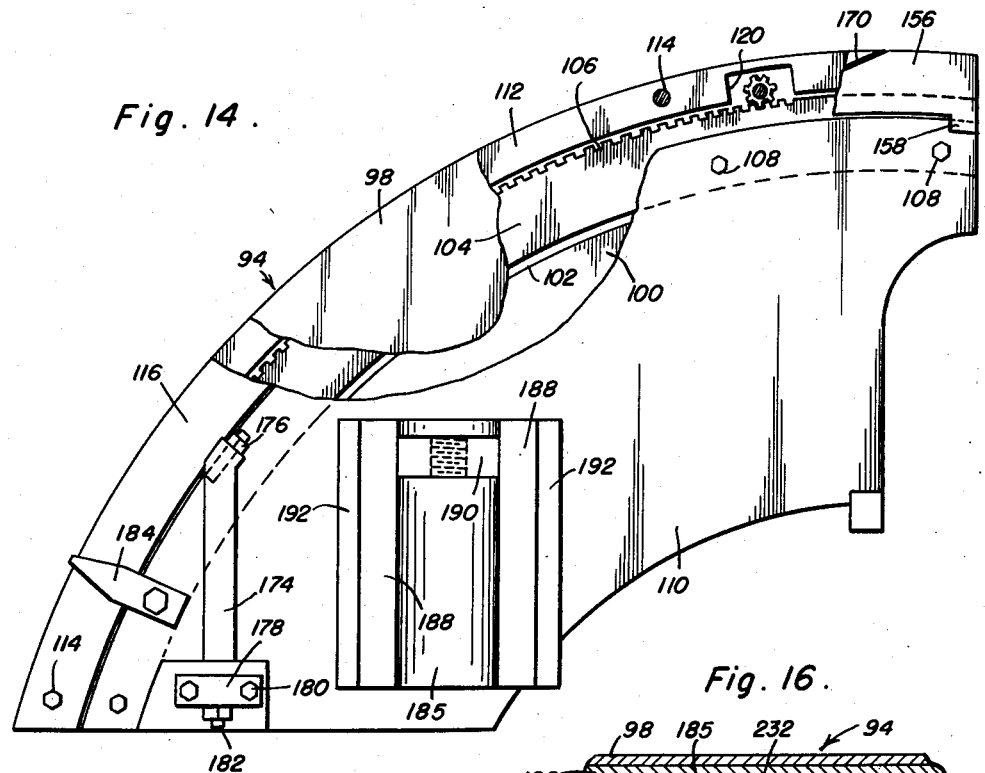

Horace C. Henry
INVENTOR.

Patented Sept. 22, 1953

2,652,862

UNITED STATES PATENT OFFICE 2,652,862

ADJUSTABLE-SAW CARRIAGE FOR FOLDING ARM RADIAL SAWS

Horace C. Henry, Sherman, Tex.

Application April 29, 1948, Serial No. 23,945

14 Claims. (Cl. 143—6).

This invention comprises novel and useful improvements in a folding arm radial saw and more specifically pertains to a supporting mechanism for a saw whereby the latter may be positioned at various angles, in various directions and may be selectively moved along a straight line at predetermined directions with respect to its support.

The primary object of this invention is to provide a supporting means for conveniently positioning a saw in various desired positions and in general for rendering the use of a power operated saw more satisfactory by enabling the user to more easily position the saw in various positions and at varying angles with respect to the work.

An important feature of the invention resides in the provision of a supporting linkage for a saw whereby the linkage may be compactly folded to position the saw closely adjacent the point of support; and may be extended to give a very large range of movement through which the saw may be operated.

A further feature of the invention resides in the provision of a supporting linkage as set forth in the preceding paragraph consisting of a pair of pivoted supporting arm members which may be angularly disposed with relation to each other and to the supporting structure of the device.

Yet another feature of the invention resides in the provision of a supporting linkage as set forth hereinbefore wherein the linkage may be locked to the supporting element of the apparatus in various positions of angular adjustment thereabout; and wherein the supporting arms may be locked with respect to each other in various angular dispositions.

A still further important feature of the invention resides in the provision of a supporting linkage as set forth above wherein a pair of parallelograms of linkage are combined to facilitate the easy positioning of the saw in any desired location within the range of movement of the apparatus.

Yet another important feature of the invention resides in the provision of a means for uniting the above mentioned parallel linkages, whereby the linkage is capable of producing a straight line movement of the saw in any predetermined direction, as the folding arms are straightened.

Still another important feature of the invention, is to provide an improved saw carriage which may be mounted upon a supporting linkage as set forth hereinbefore, wherein the saw may be tilted at various desired angles to the vertical plane; wherein the saw is mounted on a saw carriage which may be raised or lowered in a vertical plane; together with stop means for limiting the extremes of the various movements permissible in the saw carriage.

These, together with various ancillary features and objects of the invention which will become later apparent as the following description proceeds, are attained by this device, a preferred embodiment of which has been illustrated by way of example only, of the principles of the invention, in the accompanying drawings wherein:

Figure 6 is an enlarged vertical transverse sectional detail view taken substantially from the plane of the section line 6—6 of Figure 4 and illustrating the arrangement and construction of various members of the saw carriage;

Figure 7 is a further detail view at vertical transverse section taken substantially from the plane of the section line 7—7 of Figure 5 and indicating further constructional details of the saw carriage;

Figure 8 is a fragmentary sectional detail view taken substantially from the plane of the broken section line 8—8 of Figure 7 and showing the arrangement of a stop member of the saw carriage;

Figure 9 (Sheet 2) is a fragmentary sectional detail view taken upon an enlarged scale substantially from the plane of the section line 9—9 of Figure 1 and showing an operating means for adjusting a portion of the saw carriage;

Figure 10 is a similar enlarged sectional detail view taken substantially from the plane of the section line 10—10 of Figure 1 and illustrating a telescopingly adjustable handle for moving the arms;

Figure 11 is a further enlarged sectional detail view taken substantially from the plane of the section line 11—11 of Figure 1 and illustrating a locking means for the saw carriage;

Figure 12 (Sheet 1) is a further sectional detail view taken substantially from the plane of the section line 12—12 of Figure 1 and illustrating further details of the gearing means for adjusting a part of the saw carriage;

Figure 13 (Sheet 3) is an enlarged fragmentary detail view taken substantially in vertical transverse section and of the plane of the section line 13—13 of Figure 5 and illustrating the construction of an adjustable stop member of the saw carriage;

Figure 14 (Sheet 6) is an elevational view, parts being broken away, of what may be termed the base plates of the saw carriages;

Figure 15 is a side elevational view, parts being broken away and certain concealed portions being indicated in dotted line of what may be termed the head assembly of the saw carriage;

Figure 16 is a horizontal sectional view through the saw carriage taken substantially from the plane of the section line 16—16 of Figure 5 and illustrating the manner of assembling the head assembly upon the base plates of the saw carriage;

Figure 1:
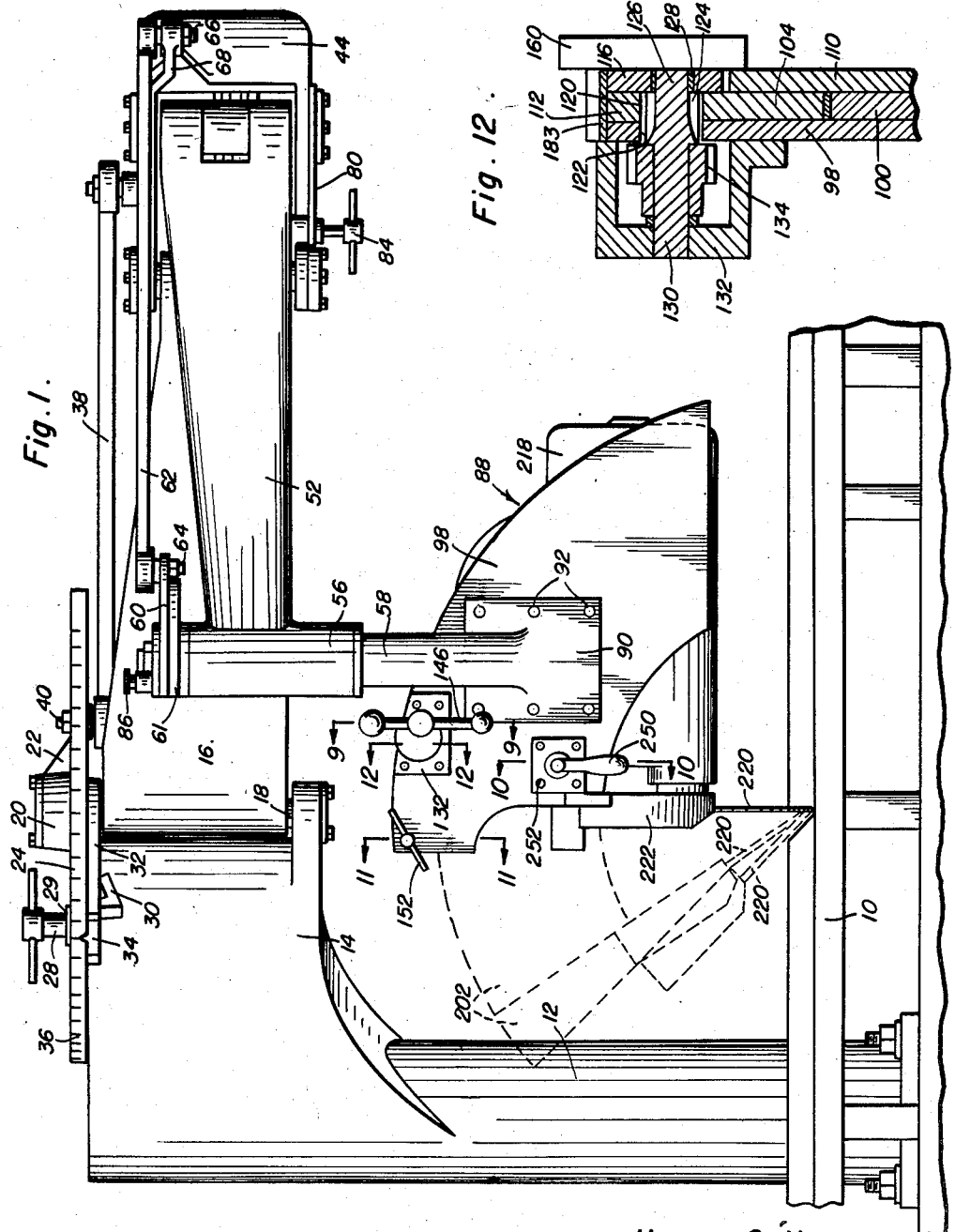
Figure 1 is a side elevational view of a preferred embodiment of the invention, the supporting linkage of the device being shown in its folded position.

Referring now more specifically to the accompanying drawings, wherein like numerals designate similar parts throughout the various views, the numeral 10 designates a table or platform of any suitable type upon which the material to be sawed is placed, this platform having rising therefrom and secured thereto a column 12 comprising a support body having a laterally extending head 14 at its upper end upon which is supported a supporting linkage carrying the saw.

Folding arm supporting linkage

The folding arm supporting linkage, shown in Figures 1, 2, 3 and 20, is intended to support the saw assembly and permit the latter to be moved at any desired distance along a straight line upon any desired radius of the vertical axis and includes an inner arm 16 which is journalled as by a pivot pin 18 to the head 14 for swinging movement in a horizontal plane throughout a range of nearly 360 degrees. This inner arm 16 is preferably of hollow construction as indicated best in Figure 20, and if desired could be formed of tubular construction.

Figure 2:
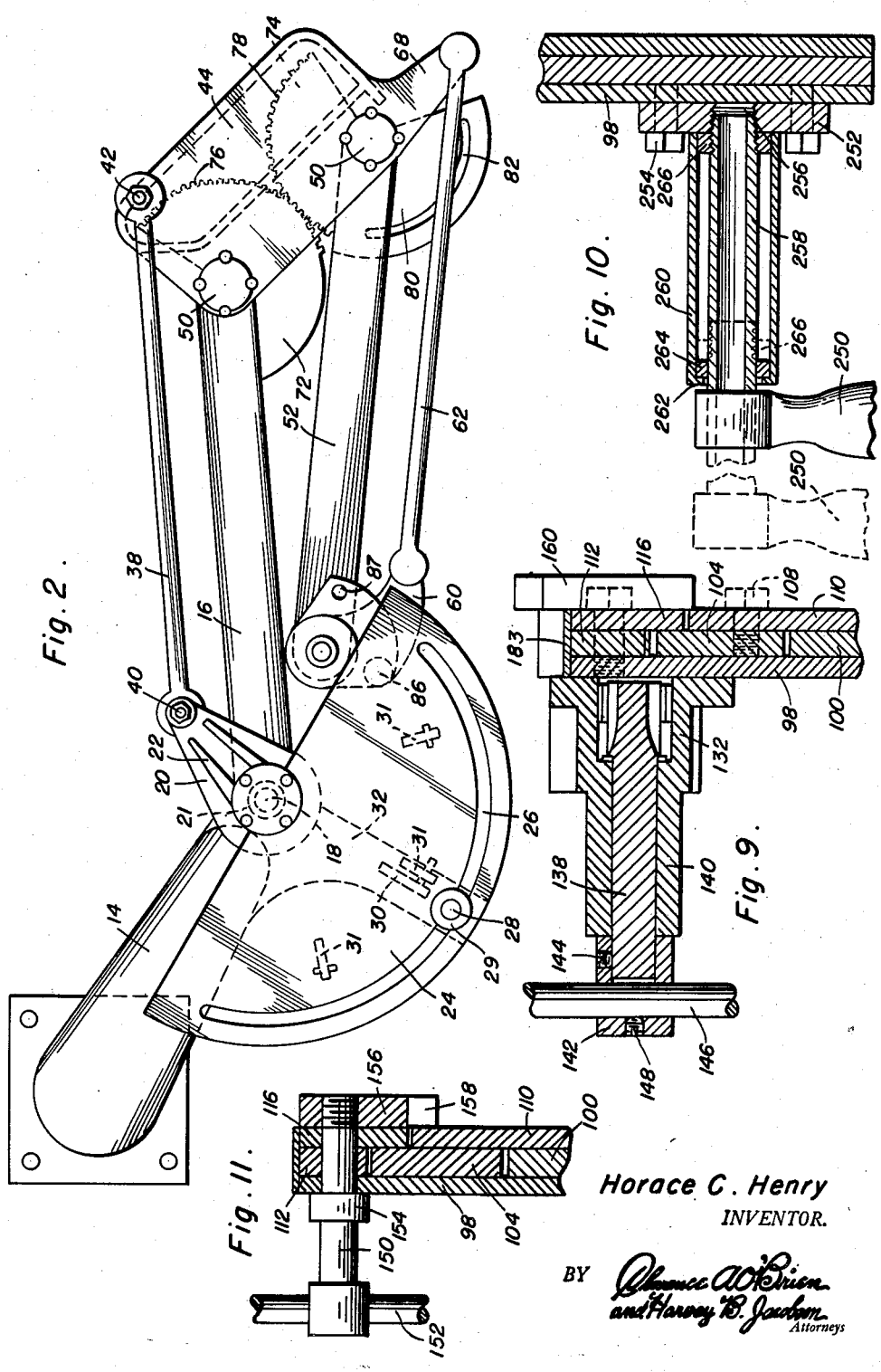
Figure 2 is a top plan view of the arrangement and position of parts shown in Figure 1, certain concealed parts of the device being indicated in dotted lines therein.

Mounted concentric with the upper end of the axle or pivot pin 18, above the head 14 of the support body is a plate 20 constituting a link, and provided with reinforcing ribs 22, see Figures 1 and 2. The plate 20 is journalled on a boss 21 rising above the surface of the plate 32 to be later described, the pin 18 being journalled in this boss.

Preferably integrally formed upon this plate 20 is a sector shaped plate 24 having an arcuate slot 26 disposed peripherally thereof. A clamping or locking bolt 28 having a shoulder 29 riding on the top of plate 24 extends through and rides freely in the slot 26, as the plate 24 is rotated, this clamping bolt extending through and being retained in a bore or aperture in a laterally extending plate 32 integrally extending laterally from the support body 14. The arrangement is such that when the clamping bolt 28 is loosened, the link 20 may be rotated freely, the clamping bolt 28 sliding through the slot 26 as the sectorial plate 24 rotates with the link. When the desired rotational position has been attained, the clamping bolt 28 is tightened, thereby locking the sector and the link 20 in predetermined position. The member 30 constitutes a movable stop member carried by the member 32 and movable into position upwardly for engagement or abutment with the adjustable, fixed stop 31 depending from, carried by and movable with the sector plate 24. These stops thus enable the operator to quickly position the plate 24 in certain predetermined, commonly used angular positions relative to the head 14 and plate 32.

As may be readily seen by reference to Figure 1, a trammel 34 may be formed upon the edge of the plate 32 for registration with an index or scale 36 forming upon the edge of the sectorial plate 24, in order to readily adjust the sectorial plate and link 20 in any desired exact angular relation with respect to the supporting head 14, independently of the members 30, 31.

A link 38 has one terminal pivotally connected as at 40 to the end of the link 20, while its other terminal is pivoted as at 42 to the upper portion of a connecting assembly housing 44, see Figure 20, to be described hereinafter. The other end of the inner support arm 16 is journalled as by a pivot pin 46 and anti-friction bearings 48 in the connecting assembly housing 44, detachable cover plates 50 being provided for obtaining access to the bearing assemblies 48 and to the pivot pin 46. It will thus be seen that the members 20, 16, 38 and 44 comprise a parallelogram for parallel linkage arrangement. In this set of links of the parallelogram, the members 38 and 16 have the same distance between their pivoted extremities, while the members 20 and 44 likewise have their above-mentioned pivot points equidistantly spaced.

An outer supporting arm 52, of generally similar construction to the arm 16, is journalled as by pivot pin 54 within the connecting assembly 44 by means of the anti-friction bearing assemblies 48 retained under the removable cover plates 50. At its outer end, the outer arm 52 is provided with a vertically extending integral tubular bushing or sleeve 56. Rotatably journalled in the sleeve 56 is a support rod 58, upon whose upper end is journalled a link or lever 60. A plate 61 (Figure 1) is rigidly attached to rod 58 and is angularly, adjustably secured to the lever 60 in order to vary the horizontal angular relation of the rod 58 and the mechanism carried thereby relative to the controlling parallel linkage of the folding arm assembly. A link 62 has one extremity pivotally connected as at 64 to the outer end of the link 60, while the other extremity is pivoted as at 66 to an arm 68 extending from the connecting assembly housing 44. It will thus be seen that the links 52 and 62, the link 60 and the arm 68 comprise a second parallel bar linkage or parallelogram, in which members 52 and 62 have the same lengths between their pivoted extremities, while members 60 and 68 likewise are equidistant between their pivot points. It should be here noted that members 38, 16, 52 and 62 are equidistantly spaced at their extremity pivots, while members 20 and 44 have the same pivot distances and members 60 and 68 are likewise equal but 44 need not be equal to 60. This construction permits straight line motion of rod 58 and the mechanisms carried thereby, relating to the members 12 and 14.

Rigidly attached to the adjacent ends of the arms 16 and 52 and concentric with their pivot pins 46 and 54, are a pair of segments 72 and 74 provided with meshing gear teeth 76 and 78 respectively. These gear teeth thereby synchronize the movements of the arms 16 and 52, whereby the two parallelograms above described, cause the straight line motion of the support rod 58 when the clamping means 28 is secured, and the arms 52 and 62 are pivoted relative to each other.

The purpose of this arrangement is to insure that a saw, or any other tool or implement which is supported by the rod 58, may be moved along a straight line towards and from the supporting post 12, as the arms 16 and 52 are folded or unfolded with respect to each other; and that this straight line movement may be adjusted angularly and rotatably about the vertical axis 18 by which the folding arms are pivoted to the support 12.

Secured beneath the connecting assembly 44, is a quadrant shaped plate 80 provided with an arcuate slot 82 therein for the reception of a locking bolt or clamp 84 carried by the lower surface of the arm 52. It will thus be seen that by locking the clamp 84, the arm 52 may be secured rigidly in predetermined angular position with respect to the connecting assembly housing 44.

A locking means which may conveniently comprise a spring-pressed plunger 86, carried by and depending from arm 60, is provided for clamping the arm 60 to the plate 61, to thereby rotatably lock the support 58 to the arm 52, this plunger being alternatively engageable in aperture 87 (Figure 2) to lock the members 60 and 61 in a 90° displaced position. Thus, the saw carriage carried by the rod 58 may be selectively locked to the folding arm linkage in one of two positions displaced 90° from each other.

From the foregoing, it will be seen that the support rod 58 may be conveniently positioned at varying distances and varying angular positions about the support column 12; and may be caused to move in a straight line to and from the member 12, along varying predetermined angular radii therefrom, and any tool mounted on the support rod 58 will therefore be movable in a straight line upon any predetermined radius which is adjustable but fixed relative to the support column 12.

*Saw carriage assembly*

Figure 3:
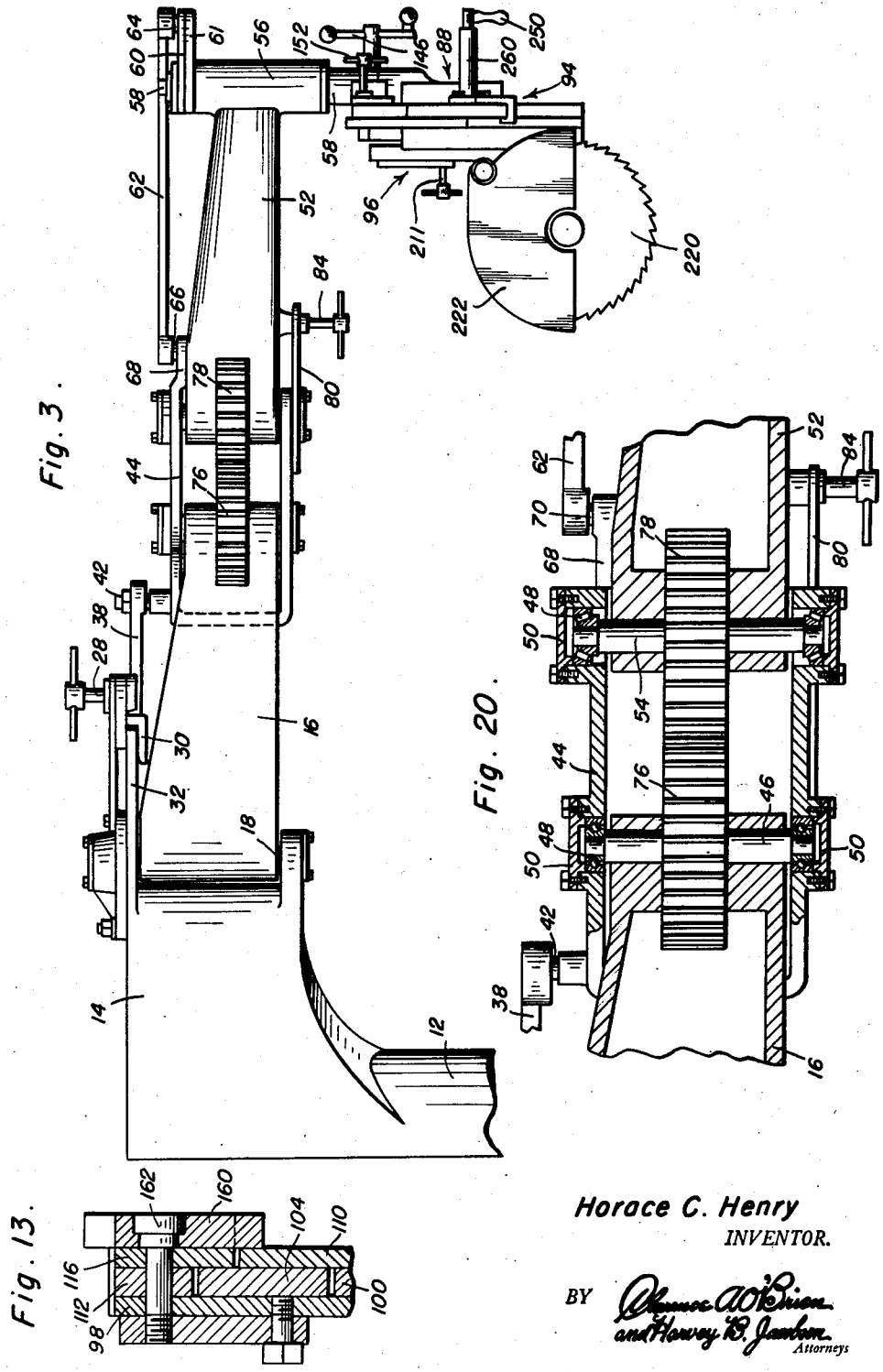
Figure 3 is a fragmentary side elevational view of the device shown in Figure 1, the supporting linkage being shown in its extended position.

As may be seen by reference to Figures 1, 3, a saw carriage assembly designated generally by the numeral 88, is rigidly attached to and supported by the supporting rod 58 for movement by the above-described supporting arm linkage. The construction of this saw assembly is best seen by reference to Figures 4, 5, 6, 14-19. As shown best in Figures 1 and 6, the support rod 58 terminates at its lower end in a support bracket 90 to which is secured as by bolts 92 the saw carriage assembly. This saw carriage assembly, see Figures 4, 6, 7 and 19, is composed of two subassemblies, a base plate assembly indicated generally by the numeral 94 and upon which is adjustably mounted a head plate assembly indicated generally by the numeral 96.

Referring first to the base plate assembly, it will be seen that there is provided a base plate 98 to which is secured a bearing plate 100, by means of the above-mentioned fastening bolts 92. This bearing plate is provided with an arcuate bearing surface 102, see in particular Figure 14, upon which is slidably mounted a slide 104 which slide is likewise arc shaped.

Figure 5:
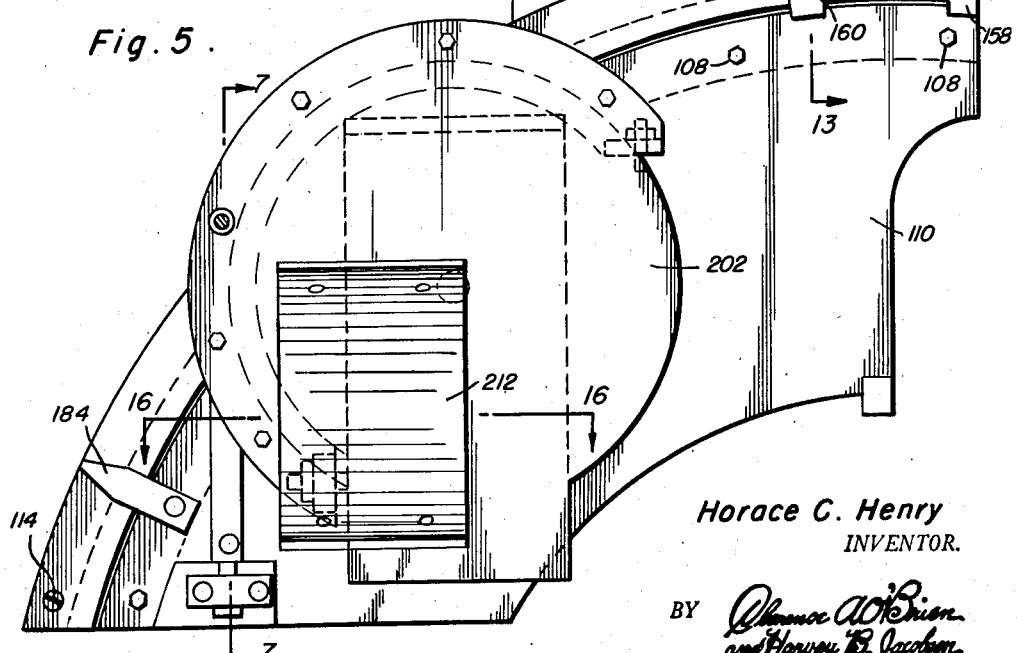
Figure 5 is a side elevational view of the saw carriage, the saw being removed therefrom and certain concealed parts being indicated in dotted lines therein.
Figure 17:
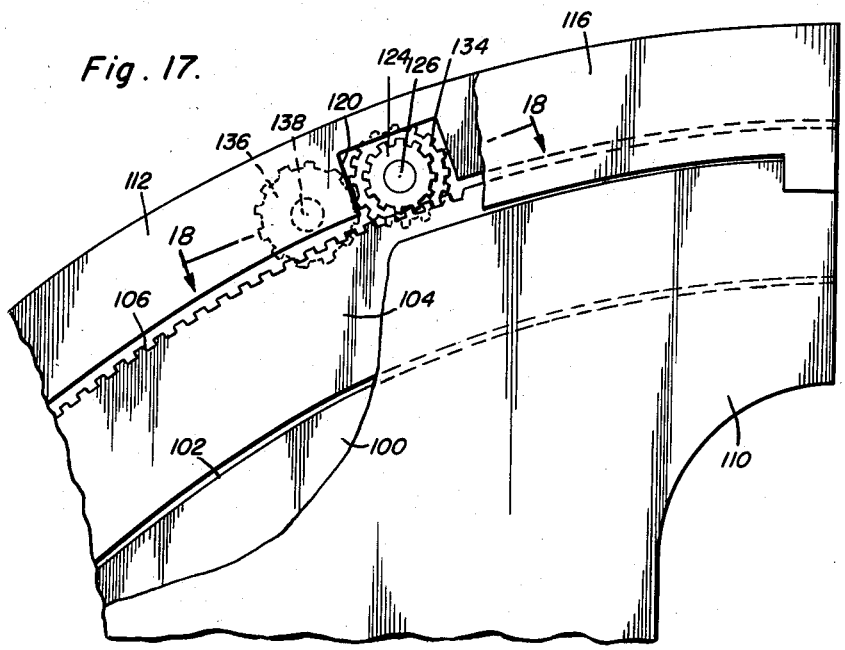
Figure 17 is an enlarged fragmentary elevational view of a portion of Figure 14, certain parts being broken away and other concealed parts being indicated by dotted lines.

Upon the upper convex surface of this slide 104 are provided a plurality of rack teeth 106 for arcuately moving the slide upon the bearing surface 102 in a manner set forth hereinafter. Rigidly attached to and carried by the slide 104 as by bolts 108, is a support plate 110. As may readily be seen by reference to Figures 1 and 14, both the carrier plate 110 and the base plate 98 are roughly quadrant shaped. It will be noted by reference to Figure 6 that the carrier plate 110 closely overlaps the bearing plate 100, while the slide 104 and bearing plate 100 lie in the same vertical plane. Also in the same vertical plane and overlying the convex outer surface of the slide 104, is a spacer or filler plate 112 which is secured to the base plate 98 and also has secured thereto as by fastening bolts 114, an arcuately shaped cover plate 116 whose lower edge overlaps the upper portion of the slide 104. This construction is best shown in Figures 5, 14 and 17.

As shown in Figures 9 and 12, 14, 17 and 18, the spacer or filler plate 112 has a cutaway portion or recess 120, which recess is aligned with an aperture or slot 122 formed in the base plate 98, and through which extends a gear 124 which is constantly in mesh with the rack teeth 106 of the slide 104. This pinion is formed upon a shaft 126, having one extremity journalled as at 128 within the cover plate 116, while the other end thereof is journalled in the wall of a housing 132 suitably attached to the base plate 98. The details of the foregoing construction are shown best in Figures 12 and 18.

Figure 18:
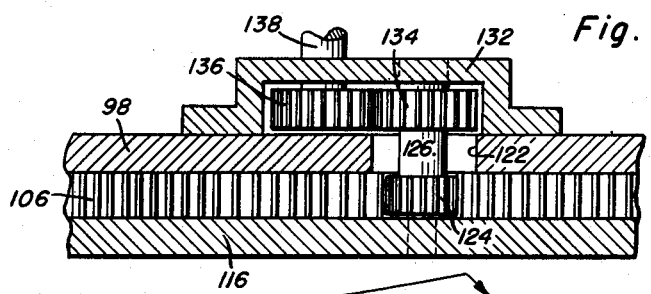
Figure 18 is a fragmentary sectional detail view taken upon an enlarged scale substantially upon the plane of the section line 18—18 of Figure 17.

As shown best in Figure 18, the control shaft 126 is provided with a gear 134, which constantly meshes with a gear 136 carried by a shaft 138, whereby rotation of this shaft will result in an arcuate sliding movement of the rack or slide, carrying therewith the sectorial shaped carrier plate 110.

As shown more clearly in Figure 9, the shaft 138 extends through a boss 140 of the housing 132, and at its outer extremity is provided with a detachable head 142 secured thereto as by a set screw 144, which head detachably receives therein a handle 146 in a transverse bore in the head, which handle is retained as by a set screw 148.

As shown in the detail view of Figure 11, a clamping means is provided for frictionally clamping and securing the carrier plate 110 in its various adjusted positions. In the retracted position, see Figure 1, the weight of the motor and other parts is capable of holding it there. This clamping means includes a bolt 150, having a handle 152 on the outer end thereof, and a collar 154 for abutting engagement with the base plate 98. The shank of the bolt 150 extends through the filler or spacer plate 112, through the cover plate 116, and at its outer end screw-threadedly engages a clamping lug or plate 156. This lug has a finger or claw 158 which overlaps and engages the outer arcuate edge of the carrier plate 110. The lug 156 thus causes plate 116 to press and grip the upper edge of plate 104, thereby clamping the same tightly to the base plate assembly.

Stop means are provided for limiting the arcuate movement of the carrier plate relative to the base plate. This means includes a stop 160 which is pivoted as at 162 to the outer surface of the cover plate 116. The position of this stop is shown in Figures 4, 5, 9, 6 and 19, while its construction and mounting is shown best in Figures 13 and 19.

Figure 19:
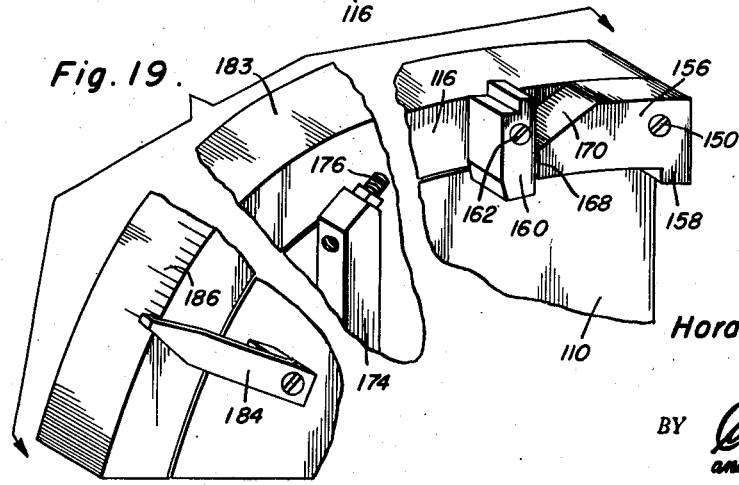
Figure 19 is a fragmentary perspective view, parts being broken away, and illustrating certain structural details of the adjustable stop means of the base plate assembly of the saw carriage; and, Figure 20 (Sheet 3) is a fragmentary longitudinal sectional view taken upon an enlarged scale, of a portion of the connecting assembly of the folding arm arrangement of the device.

The lug 156, as above mentioned, is secured adjacent one end of the carrier plate 116, and constitutes a fixed stop which is provided with a first stop surface 168 at one end thereof, and a bevelled or inclined stop 170 extending backwardly and upwardly therefrom. Obviously, the pivoted stop 160 may be so adjusted as to be positioned against either the forwardly extending surface 168, as shown in Figure 19, which is the operative position, or on the rearwardly and inclined surface 170 of the lug or stop 156, which is the inoperative position, thereby providing means for adjustably stopping the movement of the carrier plate in two positions thereof. Thus, pivoted stop 160 in the position shown in Figure 19 constitutes a stop for limiting movement of the plate 110 to a 45° angle while when 160 is pivoted into its inoperative position and lies upon the surface 170, the claw 158 constitutes a first or second stop, limiting the plate 110 to a 55° angular movement.

Adjacent its other end, the carrier plate 110 has secured thereon as by bolts 172, see Figure 7, a member 174 which has threaded therein an adjusting stop screw 176, as shown in Figures 8 and 19. This adjusting screw 176 is positioned to selectively engage the stops 160 and 158, above mentioned, at a predetermined arcuate movement of the slide and carrier plate.

As shown in Figure 7, a further stop means is provided for limiting the movement of the carrier plate. This means includes a body 178 secured as at 180 to the bearing plate 100 and provided with an adjusting screw 182 extending therethrough into position to engage the rear end of the stop member 174. As will readily be seen, the screw 182 can be adjusted to cause the stop 174 to engage the same and restrict or limit movement of the carrier plate in its retracted position.

Figure 4:
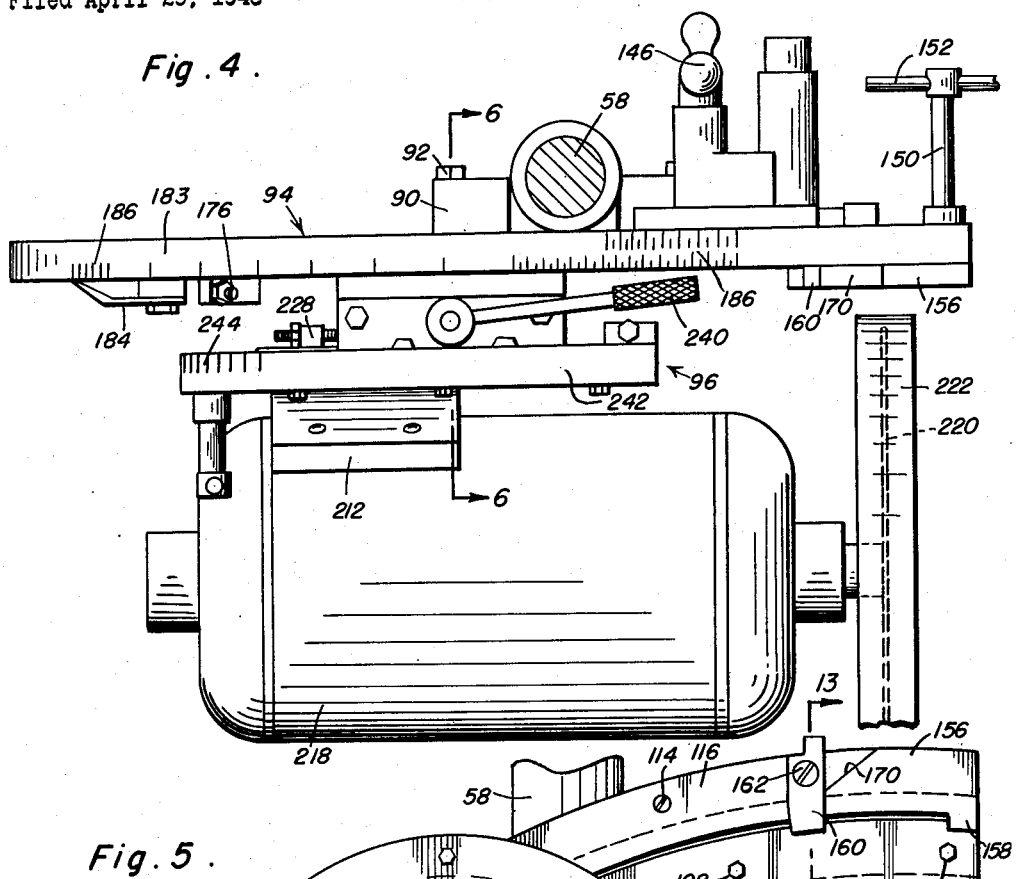
Figure 4 is a top plan view of the saw carriage, the supporting shaft therefor being shown in section.

As shown best in Figures 4 and 19, a trammel or indicator finger 184 is suitably secured to the carrier plate and is adapted to register with graduated scales 186 formed upon a peripheral housing member 183 which encloses and is secured to the edges of the base plate 98, the filler plate 112 and the cover plate 116.

Attention is now directed more particularly to Figures 6, 14 and 16 wherein it will be seen that there is secured to the carrier plate 110 a bracket 185 by means of fastening screws 187. This bracket is provided with longitudinally extending flanges or ribs 188 which are connected by a transverse rib or web 190. The exterior surfaces of the legs or ribs 188 join the body portion of the bracket along an inwardly inclined surface to form shoulders or guideways 192. This web 190 comprises the means by which the head plate assembly of the jaw carriage is adjustably mounted upon the base plate assembly. The construction of the head plate assembly will now be described by reference particularly to Figures 4–7, 14–16.

An inner plate 194 substantially rectangular in shape, see Figures 5, 15 and 16, is provided with a centrally and laterally extending boss 196. An anchor plate 198 of substantially circular shape is provided with an axial aperture by which the same is seated upon the boss 196, the anchor plate being rigidly attached to the inner plate 194 as by screws 200 (Figure 6). An outer plate 202 likewise substantially circular and of greater diameter than either of the previously mentioned plates is journalled axially upon the boss 196 for free rotation thereon. Retaining means are provided for preventing the detachment of the outer plate from the anchor plate. This means consists of an arcuately shaped clamping plate 204 together with filler or spacer plate 206, the clamping, filler and outer plates being rigidly secured to each other as by fastening bolts 208. The inner concave surface of the filler plate 206 is closely spaced from the convex outer surface of the anchor plate 198, so that the clamping plate 204 constitutes a flange which embraces the anchor plate 198 and rotatably retains the outer plate thereon. One of the bolts 208 is provided with a shoulder 209 and an extending stem 211, see Figures 3 and 7, by means of which the members 202 and 204 may be frictionally clamped on the anchor plate 198 to lock the outer plate 202 in various angularly adjusted positions.

Fastened as by screws 210 to the outer plate, is a bracket member 212 having a concave surface 214 for detachably receiving the housing of a motor 216, see Figure 4, which carries and drives a radial saw 220 provided with a guard or shield 222. Suitable fastening bolts extend through aperture 224 in the bracket 212 for detachably securing the saw motor thereto. It may thus be seen that the saw motor and blade may be readily tilted by merely rotating the outer plate 202 about the anchor plate 198, within certain limits. Extending rearwardly from the clamping plate 204, are a pair of spaced lugs 226 and 228 which are provided with adjusting screws 230 (Figs. 15 and 16) which screws are adapted to abut the relative stationary member 194 for limiting the arcuate movement of the saw supporting tilting outer plate 202.

This inner plate 194 is provided with marginal rims or legs 227 slidably embracing the legs 188.

As will be seen in Figure 16, the end surfaces of these legs 227 slide upon the shoulders 192 of the bracket 184, while the inner surfaces of legs 227 embrace, slide upon and form a dove-tailed connection with the outer surfaces of the legs 188. It will thus be seen that by means of the inner plate 194, the head plate assembly is slidably secured upon the base plate assembly for movement therewith and thereon.

As shown more clearly in Figure 6, the member 194 is provided with a transversely extending rib or plate 229 at its upper end, which plate substantially overlies the web 190 of the bracket 184. The shouldered shank 230ª of a feed screw 232 is rotatably but non-slidably secured in a bore of the plate or web 229, by means of a bushing 234 attached as by a pin 236. The screw 232 threadedly engages a suitable bore in the web 190, whereby upon rotation of the screw, the inner plate 194, and therewith the entire head plate assembly is slidably adjusted upon the bracket 184 of the base plate assembly. To facilitate such adjustment, a reversible ratchet and pawl assembly indicated generally by the numeral 238 is attached to the upper end of the shank 230, this ratchet assembly having a handle 240 for operating the same. By suitable manipulation of the ratchet assembly, which may be of any design and conventional type, the screw 232 is rotated causing a sliding adjustment of the head plate assembly upon the base plate assembly.

As shown in Figures 4 and 7, the head plate assembly is provided with a peripheral cover 242 secured in any suitable manner, which cover may be provided with suitable indicia 244 for registry with any suitable trammel whereby the angular inclination of the outer plate with respect to the inner plate may be readily seen and any desired angular adjustment may be thereby easily obtained.

It is to be noted that it is important for the center or focus of the radii of all of the arcuate surfaces of the various sliding members of the base plate subassembly 94 shall be substantially upon the surface of the saw table in order that the saw will be properly positioned upon the work throughout the entire range of adjustments.

As shown generally in Figures 1, 3, 4 and in detail in Figure 10, the plate 98 is provided with a telescopically adjustable handle 250 for manipulating the folding arm assembly. A bracket 252 is attached as by bolts 254 to plate 98 and has a threaded socket or bore 256 therein, which detachably receives the threaded end of a tubular rod 258. Welded or otherwise rigidly attached to the bracket 252 and concentric with the bore 256 is a sleeve 260 having an apertured or flanged outer end 262. A stop ring or collar 264 is secured in the sleeve 260 against the flange 262 and serves as a stop for engagement by a similar collar 266 carried by the threaded end of the tubular rod 258 and slidable in the sleeve 260.

Thus the handle 250 carried by the outer end of rod 258 may be rigidly attached to bracket 252 by the screw-threaded engagement in the socket 256, in the telescoped position of the handle, as shown in full lines in Figure 10; or alternatively, after rod 258 is unscrewed from socket 256, may be extended within sleeve 260 as shown in dotted lines in Figure 10.

The adjustable handle facilitates the manipulation of the folding arm support of the saw when making long straight cuts.

From the foregoing it is believed that the manner of operating and constructing the invention will be readily understood and further explanation is believed to be unnecessary. However, since numerous modifications and equivalents will readily occur to those skilled in the art, it is, after a consideration of the foregoing specification and attached drawings, not intended to limit the invention to the exact construction shown and described, since the drawings and description are to be regarded as illustrative of the principles of the invention only. Accordingly, it is to be understood that all suitable modifications and equivalents may be resorted to falling within the scope of the appended claims.

Having described the invention, what is claimed as new is:

1. A saw carriage comprising a base plate having a bearing surface mounted thereon, a slide oscillatably mounted on said bearing surface, means on said base plate for moving said slide, retaining means on said base plate for guiding and retaining said slide on said bearing surface, a support plate secured to said slide, a bracket secured to said support plate, a head assembly having a saw journaled thereon, said head assembly being mounted on said bracket, adjusting means for slidably moving said head assembly on said bracket, a horizontal support rod mounted for rotation about a vertical axis, means mounting said saw carriage in depending relation upon said support rod for rotation therewith about said vertical axis.

2. The combination of claim 1 wherein said bracket has a screw threaded bore, said adjusting means comprising a screw journalled in said head assembly and engaged in said bore, and a ratchet handle for rotating said screw.

3. The combination of claim 1 wherein said bracket and said head assembly have cooperating dove-tailed guideways.

4. The combination of claim 1 wherein said bearing surface and said slide are arcuate.

5. The combination of claim 4 wherein the convex surface of said slide has rack teeth thereon, said first means comprising a gear engaging said rack teeth.

6. The combination of claim 1 wherein said retaining means includes a cover plate secured to said base plate and overlying said slide.

7. The combination of claim 6 wherein said support plate is secured to and overlaps one side of said slide, said support plate being in the same plane as said cover plate.

8. The combination of claim 7 including a spacer plate in the same plane and lying beyond said slide, said spacer being secured between said base and cover plates.

9. The combination of claim 1 including a stop carried by said base plate and a pair of spaced stops on said support plate, said spaced stops being selectively engageable with said first stop for limiting the arcuate movement of said support plate.

10. The combination of claim 9 wherein one of said spaced stops has a pair of spaced stop surfaces thereon, said first stop being pivoted to said base plate and selectively engageable with said spaced stop surfaces.

11. A saw carriage comprising a base plate having a bearing surface mounted thereon, a slide oscillatably movably mounted on said bearing surface, means on said base plate for moving said slide, retaining means on said base plate for guiding and retaining said slide on said bearing surface, a support plate secured to said slide, a bracket secured to said support plate, a head assembly having a saw journalled thereon, said head assembly being mounted on said bracket and adjusting means for slidably moving said head assembly on said bracket, said head assembly including an inner plate, a guide on said inner plate slidably engaging said bracket, an anchor plate secured to said inner plate, an outer plate journalled on said inner plate, clamping means for securing said outer plate to said inner plate in selective rotational position relative thereto and a saw supporting bracket on said outer plate.

12. The combination of claim 11 wherein said inner plate has a lateral boss, said anchor plate having an aperture receiving said boss, said outer plate being rotatably journalled on said boss.

13. The combination of claim 11 wherein said clamping means comprises a clamping plate carried by said outer plate and embracing the peripheral edge of said anchor plate therebetween and means for causing frictional gripping engagement between said clamping plate and said outer plate on opposite sides of said anchor plate.

14. The combination of claim 13 including stop means carried by said outer plate for selective engagement with said guide for limiting rotational movement of said outer plate.

HORACE C. HENRY.

References Cited in the file of this patent
UNITED STATES PATENTS

| Number | Name | Date |
|---|---|---|
| 529,839 | Robinson | Nov. 27, 1894 |
| 975,070 | Richardson et al. | Nov. 8, 1910 |
| 1,491,287 | Canning | Apr. 22, 1924 |
| 1,601,610 | Carter | Sept. 28, 1926 |
| 1,646,589 | Meek et al. | Oct. 25, 1927 |
| 1,846,641 | Hedgpeth | Feb. 23, 1932 |
| 2,228,055 | Howard et al. | Jan. 7, 1941 |
| 2,265,407 | Tautz | Dec. 9, 1941 |
| 2,320,743 | Nilsen et al. | June 1, 1943 |
| 2,382,971 | Brocco et al. | Aug. 21, 1945 |
| 2,389,296 | Crane | Nov. 20, 1945 |
| 2,489,420 | Kirk et al. | Nov. 29, 1949 |
| 2,546,277 | Schwandt | Mar. 27, 1951 |

FOREIGN PATENTS

| Number | Country | Date |
|---|---|---|
| 243,405 | Switzerland | Dec. 16, 1946 |
| 691,648 | Germany | June 1, 1940 |